United States Patent
Pusl

(10) Patent No.: US 7,550,880 B1
(45) Date of Patent: Jun. 23, 2009

(54) FOLDED SPRING FLEXURE SUSPENSION FOR LINEARLY ACTUATED DEVICES

(75) Inventor: Kenneth E. Pusl, Valencia, CA (US)

(73) Assignee: Motran Industries Inc, Valencia, CA (US)

( * ) Notice: Subject to any disclaimer, the term of this patent is extended or adjusted under 35 U.S.C. 154(b) by 574 days.

(21) Appl. No.: 11/403,504

(22) Filed: Apr. 12, 2006

(51) Int. Cl.
*H02K 33/00* (2006.01)

(52) U.S. Cl. .................................. 310/15; 335/222

(58) Field of Classification Search .......... 310/14–15, 310/12, 36; 335/222, 270, 274; 267/160, 267/150
See application file for complete search history.

(56) References Cited

U.S. PATENT DOCUMENTS

| | | | |
|---|---|---|---|
| 3,295,808 A * | 1/1967 | Webb ....................... 248/605 |
| 4,083,433 A | 4/1978 | Geohegan, Jr. et al. |
| 4,236,842 A * | 12/1980 | Dick et al. ............... 400/144.2 |
| 4,454,426 A | 6/1984 | Benson |
| 4,722,517 A * | 2/1988 | Dijkstra et al. ............ 267/164 |
| 4,924,123 A | 5/1990 | Hamajima et al. |
| 5,139,242 A * | 8/1992 | Yarr ....................... 267/160 |
| 5,231,336 A | 7/1993 | van Namen |
| 5,568,032 A | 10/1996 | Wakui |
| 5,660,255 A | 8/1997 | Schubert et al. |
| 5,760,527 A | 6/1998 | Ashizawa |
| 5,823,307 A | 10/1998 | Schubert et al. |
| 5,896,076 A | 4/1999 | van Namen |
| 5,899,443 A | 5/1999 | Su |
| 6,242,846 B1 | 6/2001 | Ashizawa et al. |
| 6,378,672 B1 | 4/2002 | Wakui |
| 6,850,138 B1 | 2/2005 | Sakai |
| 7,288,861 B1 * | 10/2007 | Willard et al. ............. 310/15 |

\* cited by examiner

*Primary Examiner*—Michael C Zarroli
(74) *Attorney, Agent, or Firm*—J. E. McTaggart

(57) ABSTRACT

A family of flexure suspension systems for reciprocating linear motors, especially voice coil type, wherein basic flexure span elements, each a flat spring or typically a stack thereof, are arranged in a folded flexure configuration to suspend a moving armature from a base in a compliant manner with a precise linear stroke path along a central axis. Typically two tiers of folded flexures suspend the armature, each tier having at least two array members, each a balanced quad or triad side-by-side row of span elements, disposed in a plane about the central axis in a polar/radial or rectangular pattern. Inherent overall balance and cancellation of unwanted forces acting on the system components achieve a consistent operating air gap, eliminate undesired torque imposed on the armature, coil, and entire mechanical assembly, and reduce mass and space requirements.

20 Claims, 8 Drawing Sheets

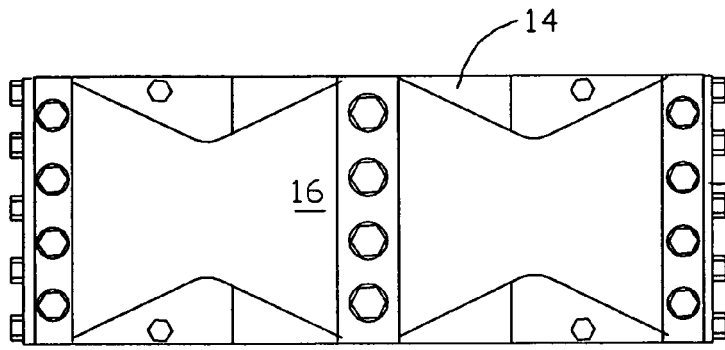
FIG. 1B
PRIOR ART
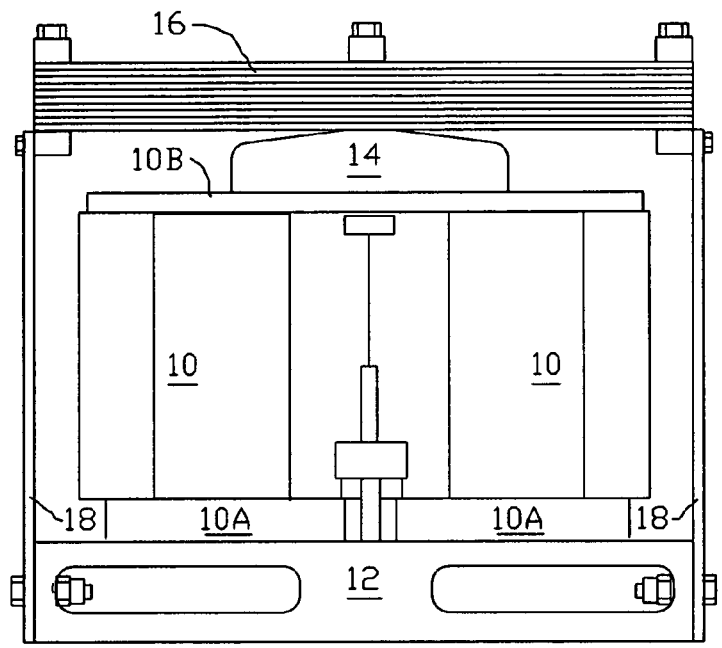
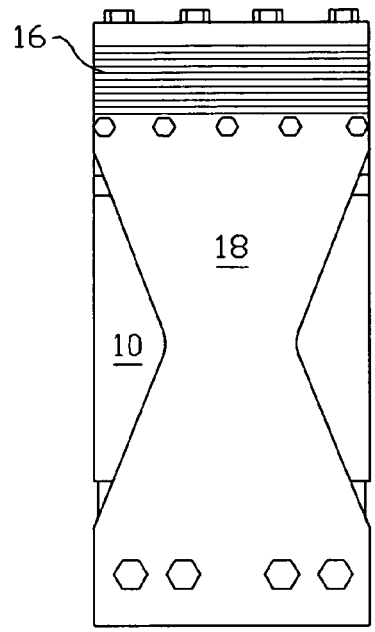
FIG. 1A  PRIOR ART  FIG. 1C
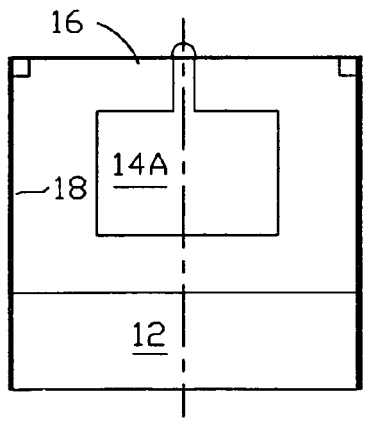
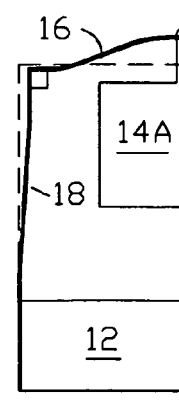
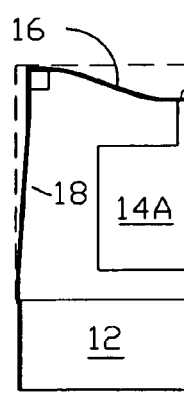
FIG. 2A    FIG. 2B    FIG. 2C

FOLDED SPRING FLEXURE SUSPENSION FOR LINEARLY ACTUATED DEVICES

FIELD OF THE INVENTION

The present invention relates to the field of linearly-reciprocating mechanisms, directed particularly to flexure systems for suspending a mass portion of an electro-magnetic linear motor as utilized in actuators, inertial masses and the like, in a compliant manner so as to be movable only in a precise straight line and over a defined stroke length, relative to a base portion thereof, for transducer purposes including electromechanical actuators, linear motors and active/passive vibration control.

BACKGROUND OF THE INVENTION

Suspension systems for reciprocating mechanical devices have been widely known and used in many different fields of endeavor. Typically their role is to constrain reciprocating movement to a straight line over a designated stroke length in various devices such as piston pumps, fuel pumps, solenoids and other actuators, linear motors and the like. An inherent primary design problem is how to accommodate the geometric need for a diaphragm or end-fixed flexure strips to stretch to greater length at the stroke-ends.

In the present field of endeavor, electromagnetic actuators, oscillating drivers and the like, the evolution that has taken place in the still ongoing search for satisfactory suspensions has included many different approaches including sliding bearings, coil springs and non-metallic resilient materials, each of which have been found less than ideal in this field of endeavor. Flat spring flexures offer high ruggedness and reliability but cannot be directly attached at both ends if substantial stroke length is required.

Known actuators have been configured with the mass traversed by and secured to a concentric shaft supported by a pair of base-affixed bearings flanking the mass, the mass and shaft being driven to reciprocate longitudinally along the central axis of the shaft.

Examples of the bearing method of suspension of a movable member mounted concentrically on an axially moving shaft are found in U.S. Pat. No. 4,924,123 to T. Hamajima et al for a LINEAR GENERATOR wherein the mass includes permanent magnets, and in U.S. Pat. No. 5,231,336 to F. T. van Namen for ACTUATOR FOR ACTIVE VIBRATION CONTROL wherein the moving mass can be magnet(s) or coil(s).

In another form of bearing suspension the reciprocating mass may be formed as a piston whose outside surface slides against the surrounding cylindrical bore of the stator portion, as exemplified by U.S. Pat. No. 4,454,426 to G. M. Benson for a LINEAR ELECTROMAGNETIC MACHINE.

The use of bearings has the disadvantages that they introduce friction and loss of efficiency and are subject to wear deterioration over time, even when kept well lubricated. These disadvantages accelerate and compound rapidly toward failure if lubrication becomes depleted.

As a further disadvantage, bearings alone do not provide any restoring force e.g. the '123 Hamajima patent shows a shaft 1 free to move axially in bearings 2 with no flexures or other axial constraint within the stroke length. Thus bearing-type suspensions are often augmented by compliant suspension elements such as coil springs in some form, e.g. an opposed pair, one at each end, in order to ensure desired positioning of the armature shaft within the stroke length, and to also create a mechanical resonance at a frequency determined by mass and compliance, i.e. spring constant.

The disadvantages of the bearings/coil springs approach can be eliminated and their respective functions can both be performed simultaneously and advantageously by the alternative approach of deploying a flexure type suspension system.

A basic flexure component could made inexpensively in the form of a resilient flat diaphragm as in a drumhead, however if fastened around the perimeter, the material must be fully resilient, i.e. stretchable, in all directions, to allow for radial variations due to geometric variations in the span throughout the stroke.

Resilient stretchable non-metallic materials are generally not sufficiently durable, stable and reliable enough to meet certain stringent demands that can be met only with flexures of solid material such as flat springs.

However flexure elements often need to be retained at one end by some form of slippage or resilient mounting, U.S. Pat. No. 5,896,076 to Frederik T. Van Namen, assigned to Motran Industries, discloses a FORCE ACTUATOR WITH DUAL MAGNETIC OPERATION for active vibration purposes, utilizing a combination of both voice coil and solenoid electro-magnetic principles in conjunction with a suspension system combining (1) a two-tier flexure system having a pair of flexure assemblies flanking the armature mass, each assembly having four radial flexure span elements in a quad polar pattern, the outer end of each span element being supported by resilient non-metallic material and (2) a pair of opposing coil springs under compression, flanking the armature mass.

Compliant materials are widely utilized, e.g. in the corrugated or foam surround cone suspension, or spiral flexures as in U.S. Pat. No. 6,850,138 to N. Sakai for a VIBRATION ACTUATOR HAVING AN ELASTIC MEMBER BETWEEN A SUSPENSION PLATE AND A MAGNETIC CIRCUIT DEVICE. Such spiral structure imparts undesirable rotation about the axis of the "spider" for voice coil suspension of consumer products such as loudspeakers where the requirements are less stringent than, for example, aerospace, where the demands generally dictate stiffer flexure systems.

In FIGS. 1A, 1B, and 1C are shown three views of an inertial actuator developed by Motran Industries for active vibration control in aircraft, utilizing the voice-coil principle in conjunction with an all-metal flexure system utilizing stacked horizontal flat spring elements supported at outer ends by relatively stiff vertical flexure elements.

In FIG. 1A, the stator portion affixed to base 12 includes a pair of tubular bobbins 10A of which the bottom ends are seen located beneath associated shell elements 10 of the vibratable armature mass portion wherein bobbins 10A carry annular voice coils. The vibratable armature mass includes central permanent magnets stacked with circular pole-pieces surrounded by the ferrous metal tubular shell elements 10, forming an annular magnetically-charged gap traversing each coil on bobbins 10A. A yoke-piece 10B links the cores mechanically and magnetically to the shell, and an auxiliary mass 14 connects the vibratable armature mass portion to a vibratable central region of the flexure assembly constituting the moving armature node.

The flexure assembly consists of a horizontal stack 16 of spring flexure strips supporting the armature mass at the center, and extending in mirror image as two opposed span elements to the two ends where each is supported by a vertical stack of rigidly attached flat springs 18 whose lower end is firmly attached to a corresponding end of the base 12.

Being co-linear, the two flexure span elements can be integrated, i.e. formed as a stack of flat spring span elements extending full length as shown in the plan view, FIG. 1B. Each span element is contoured in width as shown, approximating the shape of a double hourglass, each hourglass being located above a corresponding shell element 10.

The vertical secondary span support elements 18 are typically made to be much stiffer than the horizontal primary span elements 16 that they support, and are designed for minimal influence affecting the basic performance of the overhead flexure stack.

FIG. 2A shows, in simplified form, the basic flexure system of the actuator of FIG. 1 which includes base 12, armature mass 14A and the horizontal flexure stack 16 which forms a pair of in-line flexure spans, each having its free end attached rigidly at perpendicular corner to a relatively stiff vertical flexure support 18. In the unpowered quiescent condition shown, the armature mass 14A is located at its neutral mid-stroke location; the two flexure span elements 16 and two supports 18 are seen to be undeflected and linear.

FIGS. 2B and 2C show a left hand portion of FIG. 2A with the armature mass 14A having been driven to the top and bottom of its stroke respectively. In both cases there is a similar horizontal displacement at the upper end of vertical support 18, relative to the undeflected location shown in broken lines, due to the effective shortening of the main flexure span element 16 when fully deflected. The rigid corner results in the S-shape of the flexure span element 16 under stress of deflection, also seen to a lesser degree in the stiffer and longer support 18.

The horizontal displacement of support 18 represents vibration in the two corner regions at twice the rate of the mass portion 14A and having a non-sinusoidal waveform rich in harmonic distortion. To the extent that the direction of this spurious vibration could be made exactly perpendicular to the stroke axis, perfect left/right symmetry of the flexure structure would totally cancel the effect of the spurious vibration on the mass, so that the stroke would be unaffected. However, with a long stroke, due to geometric non-symmetry in the vertical direction inherent in this configuration of flexure supports 18, some off-axis components that fail to cancel may act upon the mass portion 14A, introducing harmonic distortion in the stroke drive force which could result in unwanted audible noise and/or loss of efficiency.

The flexure supports 18 need to be optimized to mitigate unwanted influence of their side-effects on the desired performance of the main flexure span elements 16.

In the design of actuators, higher output force requires a longer actuator to accommodate a longer stroke, or an actuator with a large diameter to accommodate additional inertial mass. A lower operating frequency also requires a longer stroke, which requires very long coil springs or flexures, adding to the bulk of the actuator and reducing the ratio of active mass to total mass. The increased dimensions and mass of such actuators tend to make them unsuitable for some special deployments, e.g. for helicopters.

It is a primary object of the present invention to provide superior structure for linear electromagnetic actuators, particularly with regard to mass-suspension, that are improved over those of known art regarding overall operational electrical efficiency, reliability, uniformity of stroke, cost-effectiveness and ease of production.

It is a further object to provide such improvements, while still utilizing known and proven magnet and coil bobbin components.

It is a further object to provide an improved flexure system in both rectangular and radial arrangements that operate under lower and more uniformly distributed stress, applicable to a wide range of applications including active vibration generation and suppression.

It is a further object to provide a system wherein all flexure stacks are all uniform in length.

It is a further object to arrange for each flexure member to be made from two functional span elements of equal compliance.

It is a further object to provide a family of flexure systems utilizing uniform flat springs as basic building blocks, that can be stacked to form flexure span elements of predetermined compliance.

It is a further object to provide array members of such flexure span elements arranged in a balanced manner such that all flexure stresses that are lateral to the central stroke axis are made to cancel each other so that automatic lateral compensation ensures that the movement of the mass portion is kept in a precise straight line throughout the stroke length, and that the moving mass portion is constrained against spurious motion such as rotation and rocking.

It is a further object to provide electromagnetic actuators, utilizing laterally compensated flexures in which the linear motor is of the "voice coil" type for uniform driving force throughout the stroke length.

It is a further object to provide an embodiment exhibiting two different mechanical resonant frequencies available for utilization as the driven frequency.

It is a further object to provide an embodiment wherein the mechanical resonant frequency can be conveniently adjusted over a predetermined range.

It is further object to hold the total mass of the inertial actuator to a minimum as required for aircraft and spacecraft.

SUMMARY OF THE INVENTION

The foregoing objects have been met in the development of a folded flat spring flexure concept directed to suspension of a reciprocating armature mass principle in a family of linear electromagnetic actuators, motors and inertial masses. The basic building blocks of the "folded flexure suspension system" are flat springs termed "span elements". A span element may be a single flat spring but more typically it is implemented as a stack of identical flat springs. In basic form, a pair of side-by-side span elements are firmly joined together at one end by a "yoke/idler fastening", while at the opposite ends they are attached respectively to a reciprocating "armature mass node" and a relatively fixed "base mass node" of a linear actuator.

A "folded flexure suspension system" of an actuator or linear motor utilizes at least one horizontal flexure "tier" containing a uniform radial array of at least two "balanced array members": either "triad array members" with three side-by side span elements or "quad array members" with four identical side-by-side span elements.

The folded flexure suspension system can readily be designed to accomplish three-dimensional symmetry and structural/stress balance along the central stroke axis as well as in the X-Y/polar plane perpendicular to the stroke axis, such that inherently all lateral flexure stress forces cancel each other and thus have no effect on the movable armature mass, while the desired axial compliance is made to be inherently balanced. The lateral symmetry additionally reacts all forces other than linear motion along the axis of suspension, eliminating the need for bearings or other support measures.

The folded flexure principle provides much design flexibility: e.g. optimal stacking of flat spring elements, optimizing span dimension and span-to-width ratio, designating one or more tiers, rectangular and radial tier layouts, and the dual resonant frequency option. This flexibility accommodates the most challenging envelope requirements.

When either of the triad or quad balanced "folded flexure" array members are utilized in conjunction with a "voice coil" type linear motor, the resultant actuator provides many advantages including excellent stroke response, electrical efficiency, reliability, reduced mass, cost-effectiveness and ease of manufacture.

BRIEF DESCRIPTION OF THE DRAWINGS

FIGS. 1A-1C show three views of an inertial actuator of known art, as described above under DISCUSSION OF KNOWN ART.

FIGS. 2A-2C are simplified representations of the basic flexure system of the actuator of FIGS. 1A-1C, depicting the mass and flexure suspension at mid-location, upper stroke limit and lower stroke limit respectively.

DETAILED DESCRIPTION OF THE INVENTION

Figure 3:
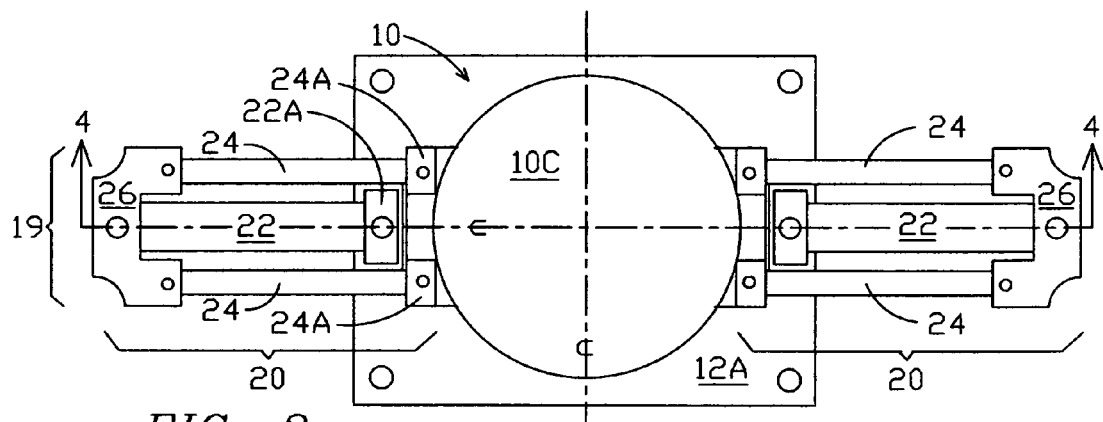
FIG. 3 is a plan view of a basic actuator utilizing a single tier folded flexure system in accordance with the present invention.

FIGS. 1A-1C and 2A-2C pertain to an inertial actuator for active vibration control of known art as discussed above.

Terms herein indicating direction such as "up", "down", "horizontal", and "vertical" are used in an arbitrary manner for purposes of facilitating descriptions in connection with the drawings showing the base at the bottom, whereas in actual deployment, e.g. on a machine or aircraft, the orientation can be expected to vary widely from that shown in the drawings.

FIG. 3 is a plan view of an electro-magnetic actuator with a single-tier folded-flexure suspension system in accordance with the present invention in a basic embodiment. In the single flexure suspension tier 19, a mirror-image pair of balanced triad array members 20 utilize a total of six compliant span elements in a layout that is symmetrical about both the lateral and the longitudinal horizontal axes that are perpendicular to the vertical central stroke axis. Furthermore, it is a design object generally that, in operation, travel of the reciprocating armature mass is to be essentially symmetrical about a quiescent point and linear along the central stroke axis.

In each balanced triad array member 20, a standard-width central flat spring span element 22 is flanked by a pair of identical half-width span elements 24 that are made to have the same standard length and thickness as span element 22 so that they act in combination as a single virtual half-flexure member having, for balance, the same spring compliance as the other virtual half-flexure member formed by central full-width span element 22. The central full-width span element 22 is attached at a first end region thereof to a pedestal member of base 12 by a bolted pressure plate 22A, and the two half-width span elements 24 are attached at a first end region thereof to the moving armature mass 10 via a side ledge formed on a mid region of the armature shell 10C, each secured by a bolted pressure plate 24A. At the other end, all three span elements (full width central element 22 and the two half-width flanking elements 24) are firmly clamped at their second end regions between two bolted pressure plates of a yoke/idler fastening 26.

The longitudinal offset between the end of full-width element 22 and the ends of half-width elements 24 at yoke/idler fastening 26 accommodates the corresponding offset between the pedestal member of base 12 and the side ledge formed on armature shell 10C. This offset enables the of full-width element 22 and half-width elements 24 at yoke/idler fastening 26 to be made equal in length.

The ends of all span elements 22 and 24 are securely clamped between flat pad surfaces on both sides including bolted pressure plates, acting as a yoke/idler fastening providing firm and well-defined contact pressure on the flat springs so as to accurately define uniform effective compliant span length and thus ensure accuracy, uniformity and stability of the compliance of each, to ensure stability of the resonant frequency, since that is determined by the overall suspension compliance and the armature mass. The end regions may be made wider in a T-shape conforming with the rectangular clamp plates 22A and 24A, and the clamp plate of yoke/idler fastening 26.

Figure 4A:
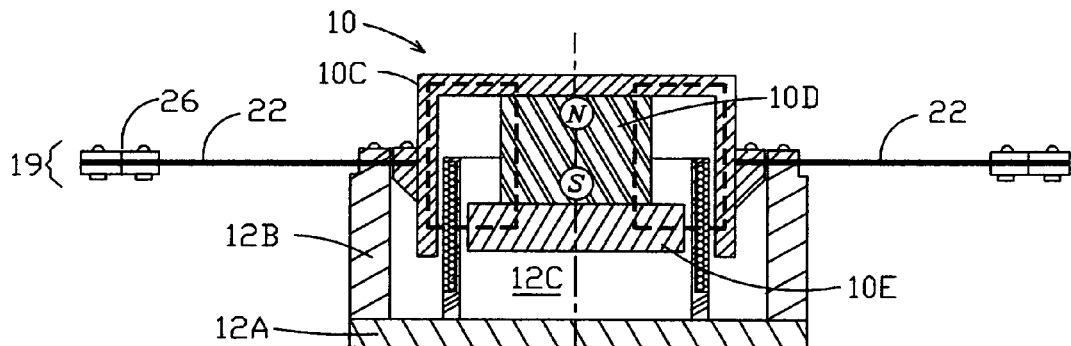
FIG. 4A is a cross-section taken at 4-4 in FIG. 3 showing the armature in its neutral quiescent location.

FIG. 4A is a central cross-section of the actuator taken of FIG. 3 taken at axis 4-4, showing the linear motor components of armature mass 10. Within armature shell 10C, a permanent magnet 10D sets up a magnetically charged annular gap between its circular pole piece 10E and the inner wall of the armature shell 10C from the magnetic flux in the loop path indicated by broken lines. Coil/bobbin assembly 12C, attached to base 12A as shown, supports the coil centered about the annular magnetically charged gap.

When the coil is energized by alternating electric current at the desired frequency of oscillation, the windings in the coil interact with the magnetic flux in the air gaps, in accordance with the well known "right hand rule" to exert force that drives the armature mass 10 along the vertical stroke axis, enabled by symmetrical flexing of the compliant suspension system, i.e. tier 19 with the two balanced array members 20 having a total of eight span elements 22 of which only two appear in this cross-sectional view since, in this quiescent condition with zero current in coil 10A, the armature mass 10 rests in its neutral mid-stroke quiescent location and all span elements 22 are undeflected and disposed at the same horizontal level.

Figure 4B:
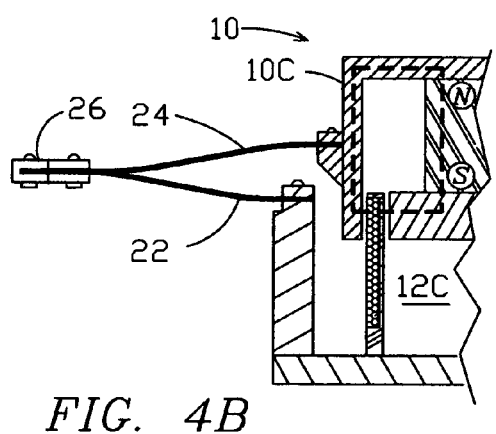
FIGS. 4B and 4C show the left hand portion of FIG. 4A with the armature driven to its upper and lower stroke limits respectively.
Figure 4C:
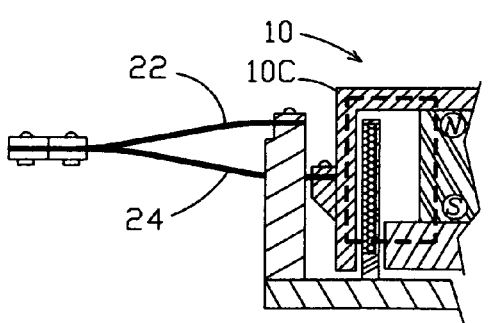

FIGS. 4B and 4C show the left hand portion of FIG. 4A with the armature mass 10 driven to its upper and lower stroke limits respectively, introducing an S-shaped curvature in the span elements 22 and 24 as shown. This curvature is longitudinally symmetrical and is equal and opposite in each pair of span elements, and is uniform in all span elements since they are all made of the same spring material and equal in length and thickness. With regard to stress, the span element is comparable to a pair of beams that are cantilevered in common at one end.

Figure 5:
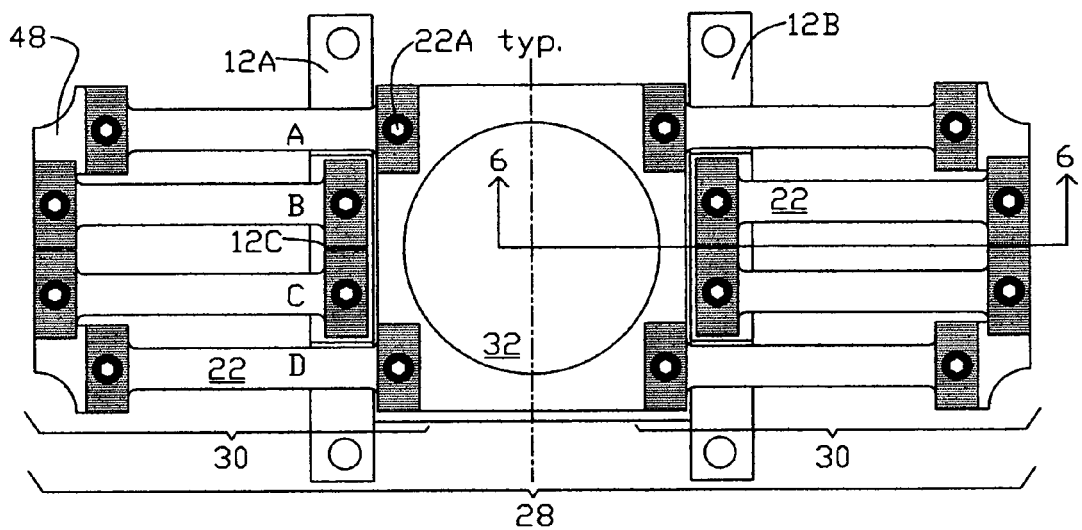
FIG. 5 is a plan view of an actuator flexure system showing an upper tier utilizing two balanced quad flexure array members in a rectangular layout.

FIG. 5 is a plan view of an actuator configured in accordance with the present invention, having a folded-flexure suspension system configured with two identical tiers 28, located near the top and bottom of the armature mass, each tier 28 having two identical balanced quad array members 30 located respectively on opposite sides of armature mass 32, providing mirror-image symmetry about the stroke axis.

In each of the two identical quad array members 30, the four standard span elements 22 are configured as stacks of a designated number of individual identical flat springs. The two outer span elements 22 (A and D as indicated) are attached to the armature 32 by bolted yoke/idler fastenings 22A. The two inner span elements (B and C) are attached to a base pedestal plate 12C, secured by corresponding bolted yoke/idler fastenings 22A. The opposite ends of all four span elements 22 are connected together by a common yoke/idler spacer plate 48. Optionally this could be split into two spacers, one attached to span elements A and B and the other to span elements C and D.

Two base end plates 12A and 12B are configured with extension portions that extend at the four corners to form mounting feet for attachment to a host vehicle or machine.

Figure 6:
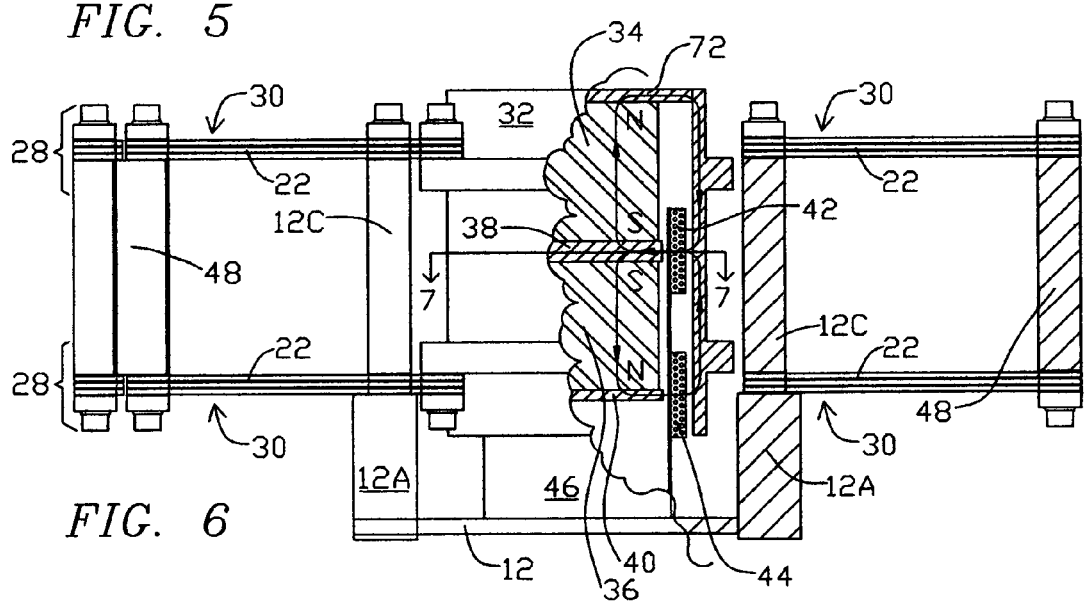
FIG. 6 is a front view of an actuator utilizing two folded flexure tiers as in FIG. 5, showing the armature partially cut away to reveal a cross-section taken at 6-6 of FIG. 5.

FIG. 6 is a front view of the actuator of FIG. 5, with a right hand portion cut away to show a cross-section through 6-6 of FIG. 5, i.e. through the central stroke axis.

The armature mass node of the reciprocating linear motor includes armature shell 32 containing two permanent magnets 34 and 36, polarized as shown, i.e. NSSN (alternatively SNNS), along with two associated pole-plates 38 and 40 which interact with the shell to create the two magnetic flux paths indicated by broken lines.

At the two annular gaps the magnetic flux concentration traverses coils 42 and 44 wound on bobbin 46: with these connected in aiding polarity, the armature 32 will be made to reciprocate along the stroke axis when A.C. is applied to the coils at a primary frequency which is made to approximate the natural physical resonant frequency of armature 32 as determined by its mass and the compliance (spring rate) of its suspension system, i.e. the two tiers 28, each containing two quad arrays 30.

The left hand portion of FIG. 6 is a front view of the left hand portion of the actuator showing the left hand assembly with quad arrays 30 in the upper and lower tiers 28 tied together at the left hand end by yoke/idler spacer 48. At the right hand end of span elements 22, the outer span (A and D) elements 22 are attached to armature 32 and the inner span (B and C) elements 22 are attached to a base spacer 12C which is supported at the bottom on base end plate 12A.

The left and right hand flexure assemblies are identical and are located in mirror-image symmetry about the central stroke axis as shown in the neutral quiescent state with no current applied to the coils 42 and 44 therefore all span elements 22 are horizontal and unstressed.

The idler plate spacers connected between the yoke/idler fastenings 48 of the two tiers 28 are not essential for operation, but the spacer connection does improve lateral stiffness of the system and the weight penalty of the additional mass required for the spacer connection is cut in half, because the mass is moving half the armature stroke in the force direction thereby contributing to the force output.

In the quad array member, all four span elements are typically made identical; however symmetrical variations about mid-span in thickness and width can be considered as a possibility to more efficiently distribute stress and reduce mass. Such variation was previously described by the hourglass contour of span elements 16 in FIG. 1.

Figure 7:
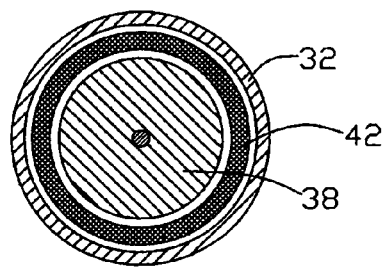
FIG. 7 is a cross-section taken at 7-7 of FIG. 6.

FIG. 7 is a cross-section taken through 7-7 of FIG. 6, showing the concentric arrangement of pole 38 and the armature shell 32, forming there-between the magnetically charged annular air gap traversing coil 42. Adequate clearance must be allowed on both the inside and outside region of coil 42 to allow the armature mass shell 32 and pole 38, to move reliably throughout the stroke range without mechanical interference with coil 42.

Figure 8A:
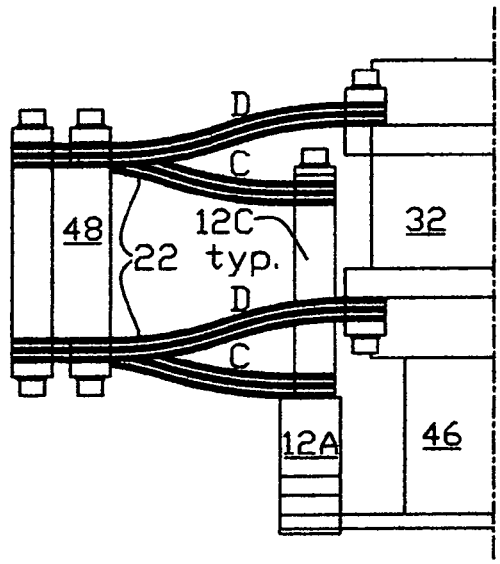
FIGS. 8A and 8B show the actuator of FIGS. 5-7 with the armature mass driven to its upper and lower stroke limits respectively.

FIG. 8A depicts the left hand portion of FIG. 6 with the armature 32 having been driven by coil 46 to the upper limit of its stroke, creating the S-shape deflection seen in span elements 22. Spacer plate 12C is seen spacing the right hand end of span elements 22 supported at the bottom by base end plate 12A.

Figure 8B:
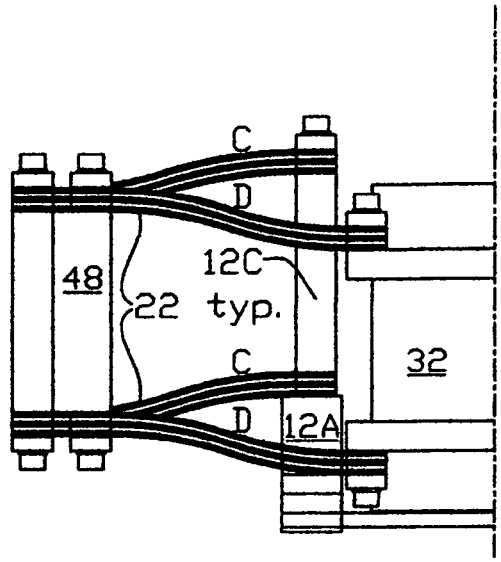

FIG. 8B depicts items of FIG. 8A with the mass portion in shell 32 having been driven to the lower limit of its stroke, creating the same S-shape downward deflection in upper tier and the lower tier span elements 22 (D and C), again seen tied together at their left hand end by yoke/idler spacer 48, and the right hand end, elements D attached to and spaced apart by the armature 32, and elements C attached to and spaced apart by base pedestal plate 12C.

In view of the foregoing descriptions, the concept of a folded arrangement of pairs of uniform flat spring flexure/span elements 22 rigidly coupled at one end by offset yoke/idler fastenings eliminates the requirement for stiff vertical support flexures as described above in connection with suspension utilizing known full length flexure span elements. The present folded concept cuts the length of flexure element to about half, returns the load path to the center of the unit, supports the armature symmetrically in all three axes, and is very stiff off the force axis. In addition, the concept enables design for reduced size, mass and armature-connected flexure array members with identically and symmetrically arrayed span elements, providing identically and symmetrically balanced forces.

Figure 9A:
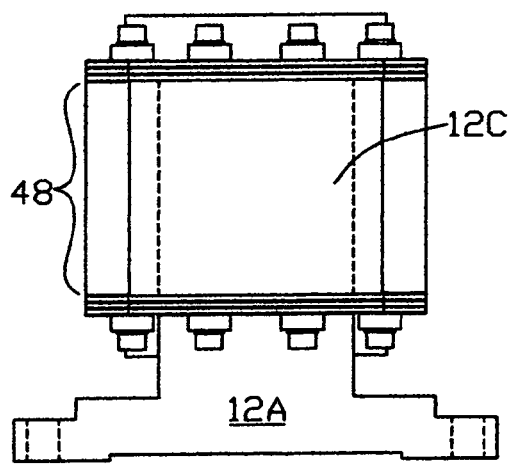
FIG. 9A is a right-hand side view of the actuator of FIGS. 5-7, showing a base mounting configuration.

FIG. 9A is a right-hand side view of the actuator of FIGS. 5 and 6, showing base end plate 12A extended to provide mounting feet, also shown in FIG. 5. The location of base pedestal plate 12C, concealed by idler plate 48 in this view, is indicated by broken lines.

Figure 9B:
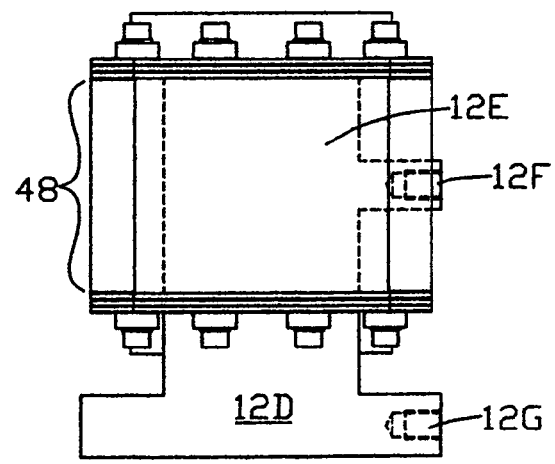
FIG. 9B shows a side mounting configuration as an alternative to the base mounting configuration of FIG. 9A.

FIG. 9B, from the same viewpoint as FIG. 9A, depicts an alternate side mount location implemented by utilizing modified base end plate 12D and modified base pedestal plate 12E with side extensions constituting the alternate side mounts 12F and 12G each configured with a threaded mounting hole facing to the right as shown. With the same modification in the opposite half of the actuator, four side mount fittings are provided, enabling specification of an alternative side mount configuration for connection to the host machine or vehicle.

Figure 10:
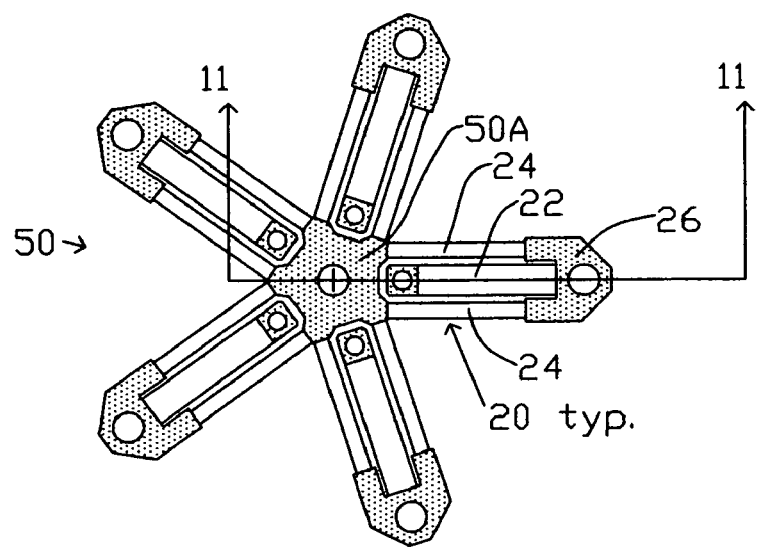
FIG. 10 is a plan view of a folded flexure tier assembly having five balanced triad array members with their yoke/idlers directed outwardly in a uniform polar pattern.

FIG. 10 is a plan view of a radial-patterned tier 50 with five balanced triad array members 20, as shown and described in connection with FIG. 3, arranged in a uniform radial star pattern with each member 20 extending outwardly from the central stroke axis to attachment points on the idler yoke/idler fastenings 26. In the central region, the inner ends of the ten half-width span elements 24 are connected via central hub 50A and a central spacer (62, FIG. 11) to the reciprocating armature mass suspension node, while the inner ends of the five full-width radial span elements 22, located near hub 50A of each tier 50 are connected via a set of spacers (60, FIG. 11) to the top and bottom plates of the main enclosure that constitutes the base suspension node.

Figure 11:
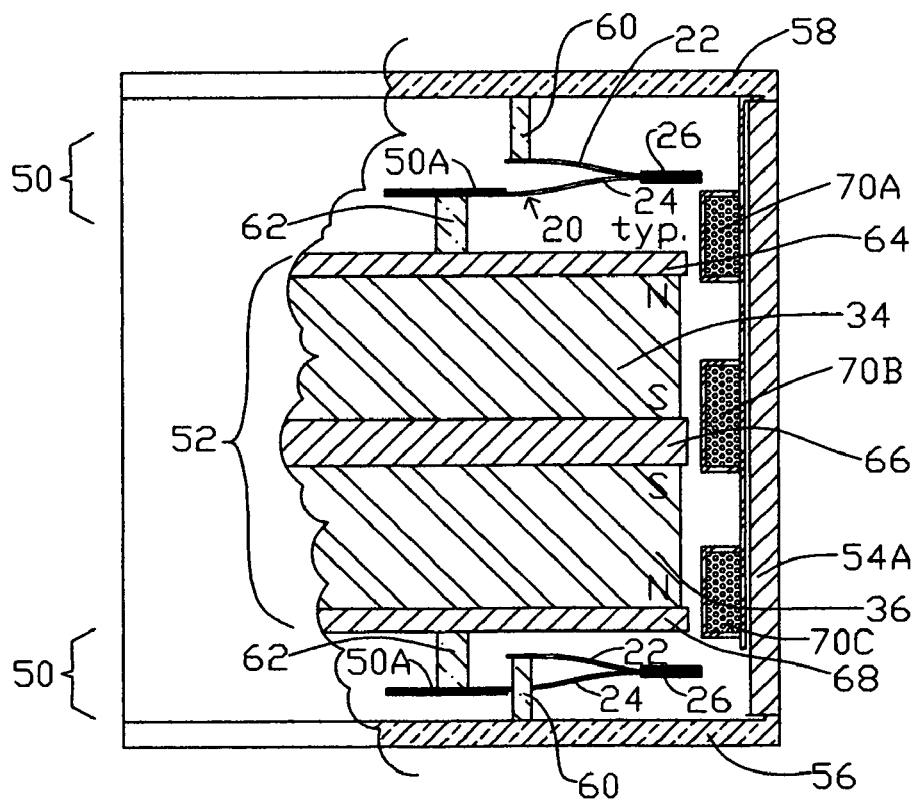
FIG. 11 is a cut-away/central cross-section view of a linear motor of an actuator showing internal components and one of the five folded flexure array members in the radial flexure assembly from FIG. 10 and illustrating the displacement of the span elements and armature mass when a downward force is applied to the armature mass.

FIG. 11 is a partially cutaway side view illustrating the deployment of two radial star-pattern flexure tiers 50 as in FIG. 10 deployed above and below its reciprocating armature 52 of a linear actuator.

For clarity and ease of understanding, the armature 52 is shown having been driven downwardly in order to show both span elements 22 and 24 as deflected accordingly. At the center of the stroke range, i.e. in a quiescent state with no current applied to coils 70A-70C, span elements 22 and 24 would be undeflected, i.e. straight and disposed in a common horizontal plane.

The base suspension node of the reciprocating linear motor consists mainly of the main enclosure formed by body sleeve 54A which is made of ferrous metal to serve as a magnetic yoke and whose ends are enclosed by non-magnetic base plate 56 and top plate 58.

The armature mass node 52 includes two permanent magnets 34 and 36 stacked together alternately with three pole pieces 64, 66 and 68 and symmetrically polarized NSSN as shown (or alternatively SNNS), setting up the three annular magnetically-charged gaps that traverse and interact with three coils 70A, 70B, and 70C wound on a common bobbin, to generate the reciprocating armature movement when alternating current is applied to the coils 70A-C at the natural resonant frequency.

Shown above armature 52 is one of the five balanced triad array members 20 of tier 50 with its full-width span element 22 attached to top plate 58 via a spacer 60 and its two half-width span elements 24 connected to the armature 52 via hub 50 and a central spacer 62. The lower end of armature 52 is suspended by an identical lower tier 50 with the ends of five full-width span elements 22 attached via spacers 60 to base plate 56, and ten half-width span elements 24 each attached via hub 50 and spacer 62 to armature mass 52.

Figure 12:
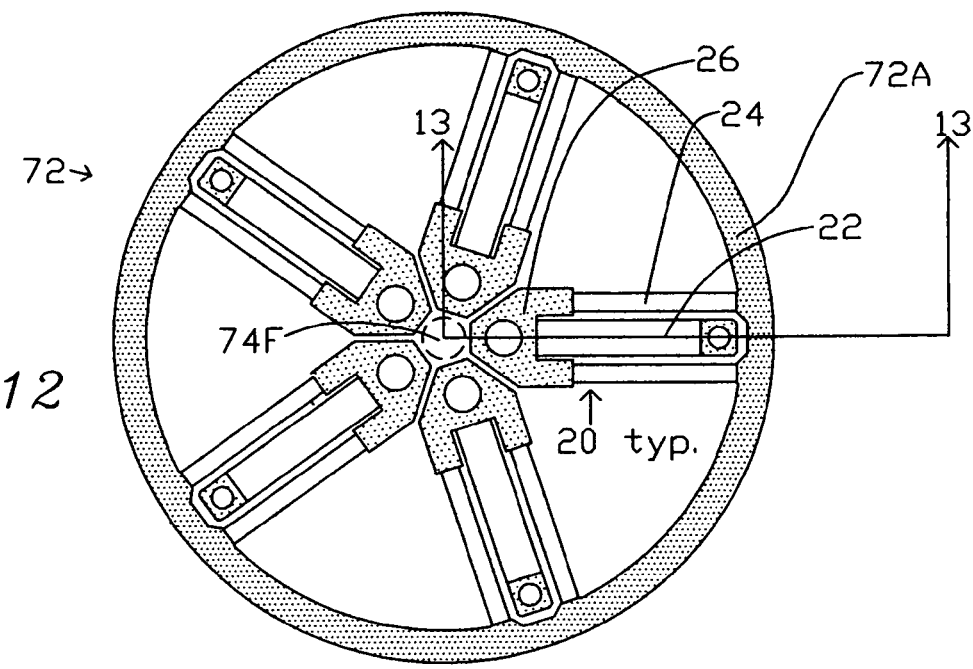
FIG. 12 is a plan view of a folded flexure tier assembly having five balanced triad array members with their yoke/idlers directed inwardly in a uniform polar pattern.

FIG. 12 is a plan view of a wheel-shaped radially configured folded flexure tier 72 utilizing five triad array members 20, functionally as shown and described in connection with FIGS. 3 and 10 (but optionally modified therefrom dimensionally). The uniform radial layout of flexure tier 72 in FIG. 12, corresponding to five spokes of a wheel, may be considered the converse of the star pattern of tier 50 in FIG. 10, the main difference being the reverse direction of the individual triad array members 20. In the wheel-shaped pattern of flexure tier 72, the outward ends of the ten half-width span elements 24 are directed to the base node via circumference rim 72A, while the outer ends of the five full-width span elements 22 are directed to the reciprocating armature mass node via spacers located adjacent to circumference rim 72A.

In tier 72, the five yoke/idler fastenings 26 are located in the central region as opposed to the peripheral region in FIG. 10). Yoke/idler fastenings 26 are free-standing and unattached to each other to allow for their radial displacement over the stroke range.

Shown at the center in broken lines, a central drive shaft 74F, attached to the armature mass, may be provided as an option when required for purposes of external actuation.

Figure 13:
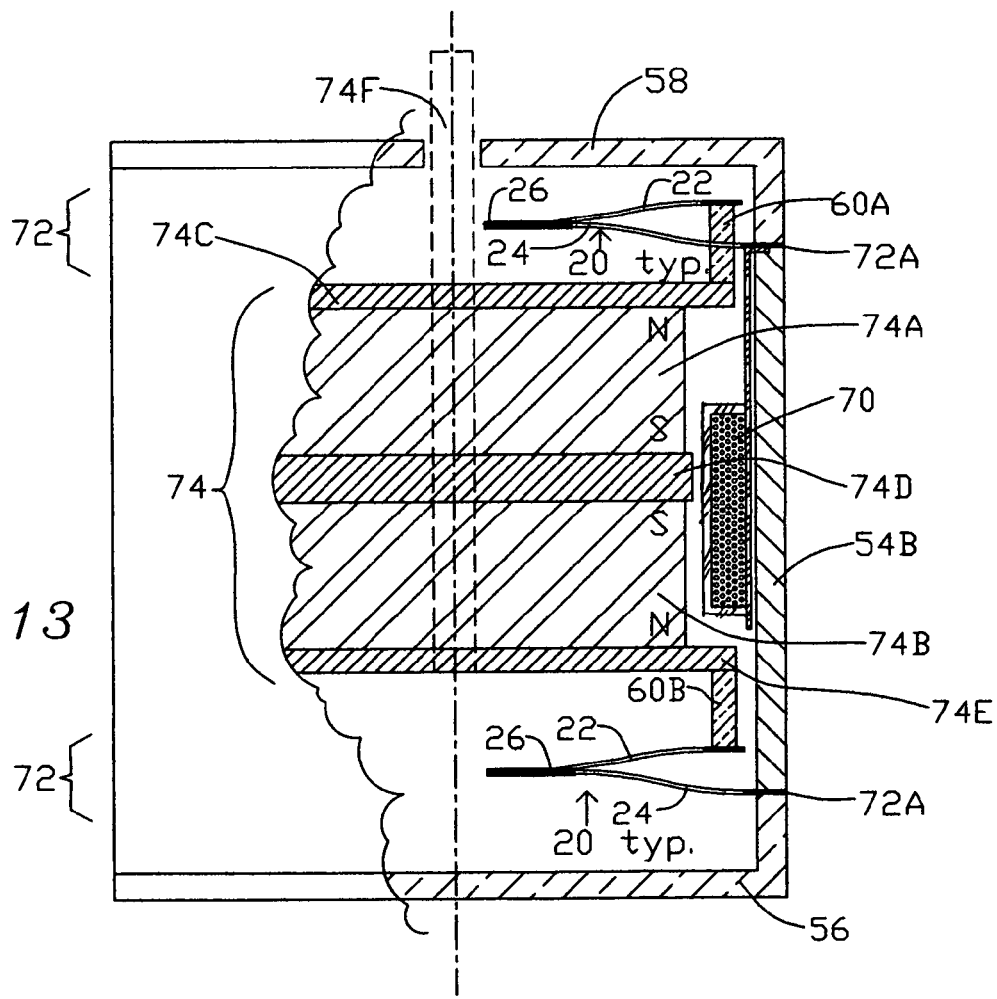
FIG. 13 is a cutaway/central cross-section view of a linear motor of an actuator, showing internal components and one of the five folded flexure array members in the radial flexure assembly from FIG. 12 and illustrating the displacement of the span elements and armature mass when an upward force is applied to the armature mass.

FIG. 13 depicts a reciprocating actuator utilizing two wheel-shaped tiers 72 as in FIG. 12, located above and below the suspended armature mass 74, which for clarity and ease of understanding, is shown having been driven upwardly in order to show a typical one of the five triad array members 20 with its span elements 22 and 24 deflected accordingly. The enclosure is formed by the assembly of non-magnetic top cap 58, tubular ferrous sleeve 54B and non-magnetic base cap 56, constituting the base suspension node of the actuator.

Full-width span elements 22 above and below armature mass 74 are seen connected to the upper and lower pole plates 74C and 74E via spacers 60A and 60B, and the flanking half-width span elements 24 are seen directed to annular rims 72A which are clamped firmly between the respective end cap (56, 58) and the ends of ferrous sleeve 54B, with the outer ends of half width span elements 24 attached to annular rim 72A which, in each tier 72, is clamped in place on the top and bottom of sleeve 54A by caps 56 and 58.

In the reciprocating linear motor/actuator system, armature 74 includes two permanent magnets 74A and 74B, polarized as shown, stacked with three pole-plates 74C, 74D and 74E interacting magnetically with ferrous sleeve 54B acting as a magnetic yoke to set up the concentrated flux at the annular gap at central pole piece 74D. This magnetically-charged gap interacts with coil 70 to generate the motor/actuator force. The bobbin surrounding coil 70 is seen to have an outward flange at the upper end secured in an annular space provided around the inner edge at the top end of sleeve 54B to secure the bobbin in place.

The optional central drive shaft 74F, shown in broken lines traversing the clearance opening in top plate 58, provided as an option when it is desired to transmit the armature stroke to an external node, could optionally be located to exit at the bottom or at both top and bottom.

Figure 14:
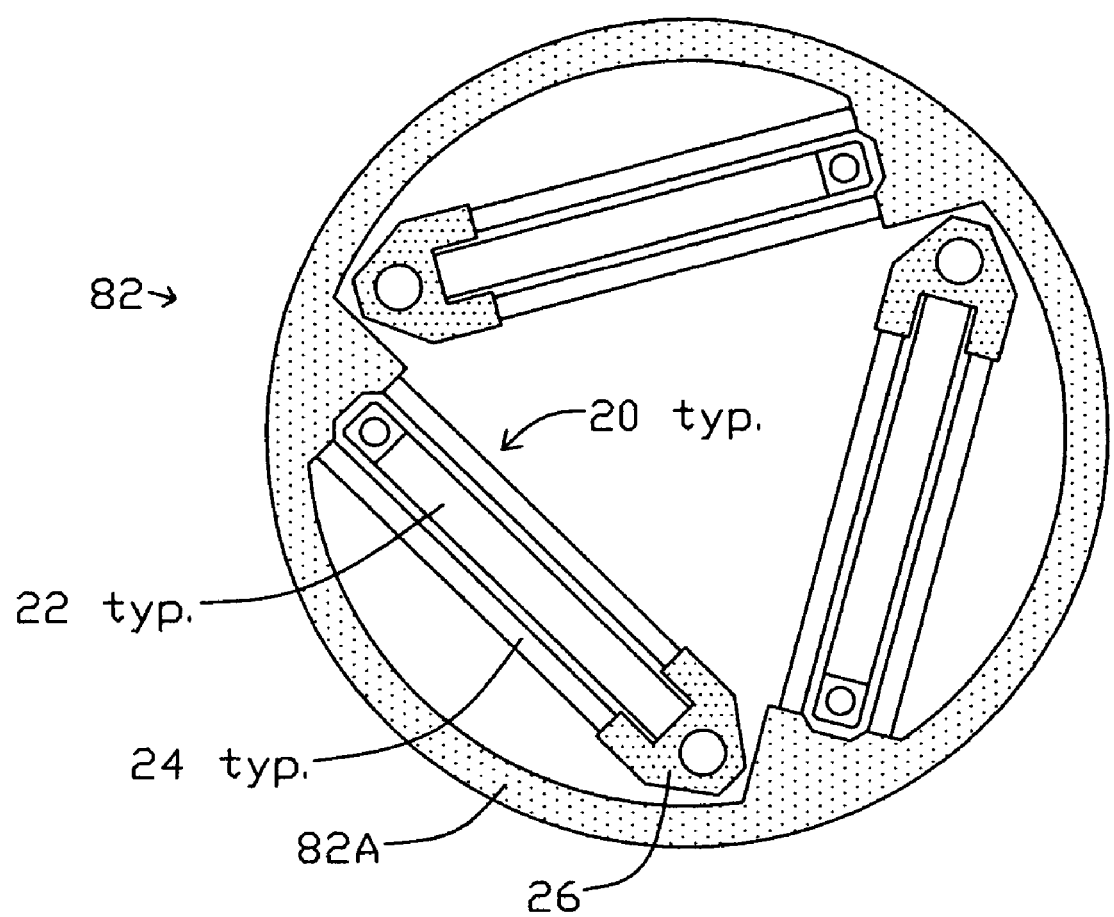
FIG. 14 is a plan view of a folded flexure tier assembly having three balanced triad array members arranged in a triangular chordal pattern.

FIG. 14 is a plan view of a polar folded flexure tier 82 having three balanced triad array members 20 arranged in a uniform chordal pattern forming an equilateral triangle as shown. The three full-width span elements 22 are attached via spacers to the reciprocating armature mass node while the six half-width span elements 24 are attached to the base node via annular peripheral rim 82A.

Chordal-shaped tier 82 (FIG. 14) along with star-shaped tier 50 (FIG. 10) and wheel-shaped tier 72 (FIG. 12) form a family in the category of polar/radial folded flexure suspension tiers. Typically deployed in identical pairs flanking the armature mass, any one of them may be deployed in conjunction with armatures and enclosures of many different configurations including those shown in FIGS. 11 and 13.

Folded flexure polar/radial tiers facilitate the overall coaxial configuration and packaging of reciprocating actuators, and inherently act to stabilize the armature against horizontal movement relative to the base node components in a manner that is virtually uniform for all horizontal directions. This allows the air gaps to be of minimum size, thus increasing the electro-magnetic efficiency, and also eliminates the need for bearings with their attendant limited life and resistance to motor/actuator output.

In addition to the three basic polar/radial tier configurations as discussed above: star (FIG. 10), radial (FIG. 12) and chordal (FIG. 14), the invention may be practiced with tiers having a different number of balanced triad array members 20 than shown, e.g. the chordal, shown as a triangle, could be made alternatively as any polygon: square, pentagon, hex, etc.

There is potential for practicing folded flexure polar/radial tiers of this invention in conjunction with other configurations of array members, e.g. two elements of standard width would form an array member that, while unbalanced per se, could be counterbalanced by a similar member disposed oppositely in polar/radial symmetry.

Tier assemblies in the category of polar/radial folded flexure suspension tiers, including chordal tier 82 (FIG. 14), star-shaped tier 50 (FIG. 10) and wheel-shaped tier 72 (FIG. 12) lend themselves to an integrated concept of fabrication where the entire pattern of the tier is formed integrally from a single sheet of material with voids to form the general shape of the tier, and a uniform basic thickness, greater than that of a flat spring, the thickness being reduced symmetrically on both sides, e.g. by machining, molding or chemical etching, to form the thin flat springs as flexure elements wherever required in the pattern. This concept greatly reduces the number of individual parts, e.g. by eliminating separate parts such as fastening plates of yoke/idler fastening 24A in FIG. 3 and yoke/idler fastenings 26 in FIGS. 3, 10, 12 and 14, since these yoke/idlers would be formed integrally as simply the full thickness of the sheet of material. The tier may be formed as a stack containing two or more identical integral tier layers made either from metal or suitable composition material.

Figure 15:
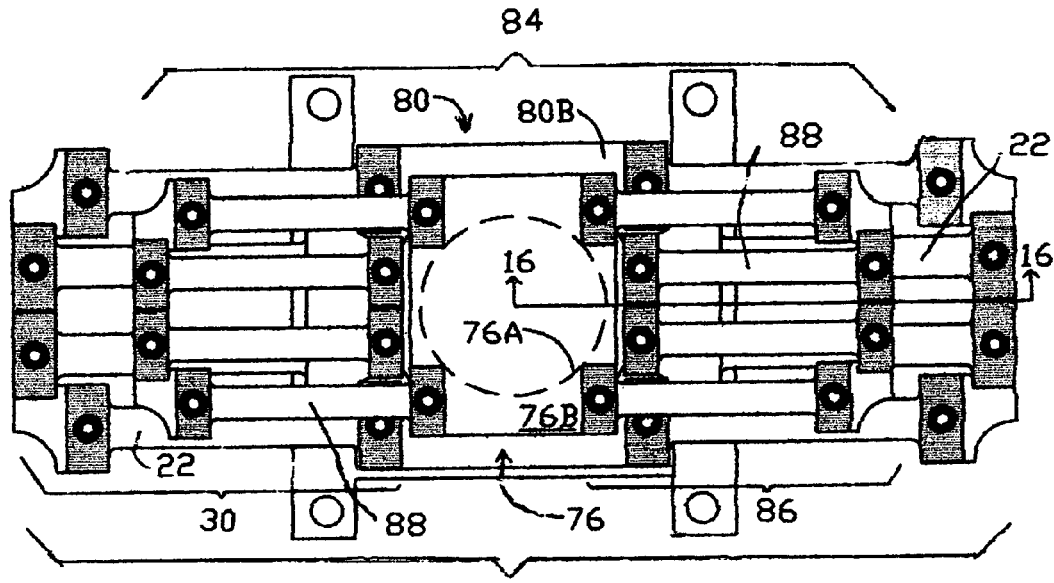
FIG. 15 is a plan view of a dual-resonance actuator with a three tier folded flexure system utilizing six balanced quad folded flexure array members.

FIG. 15 is a plan view of an actuator with a three tier folded flexure system that is characterized by two different natural resonant frequencies, i.e. two degrees of freedom, accomplished by suspending two moving mass nodes from a common base: a magnetic armature 80 with a ferrous shell, of which upper mounting flange 80B is visible, and a moving coil assembly 76 which includes a tubular bobbin 76A fastened beneath rectangular mounting/attachment cover 76B in the central location indicated by the circular outline.

The armature 80 is suspended by two flexure tiers 28 located at upper and lower regions of armature 80, each tier 28 including a pair of balanced quad array members 30 as described in connection with FIG. 5.

To add the second degree of freedom, an additional modified tier 84 is located above the other two tiers, suspending the moving coil assembly 76. In the modified tier 84, special array members 86 contain span elements 88 that are made different in length from the standard span elements 22: typically shorter as shown, so as to provide the desired compliance (spring rate) difference required for the two resonant frequencies.

Figure 16:
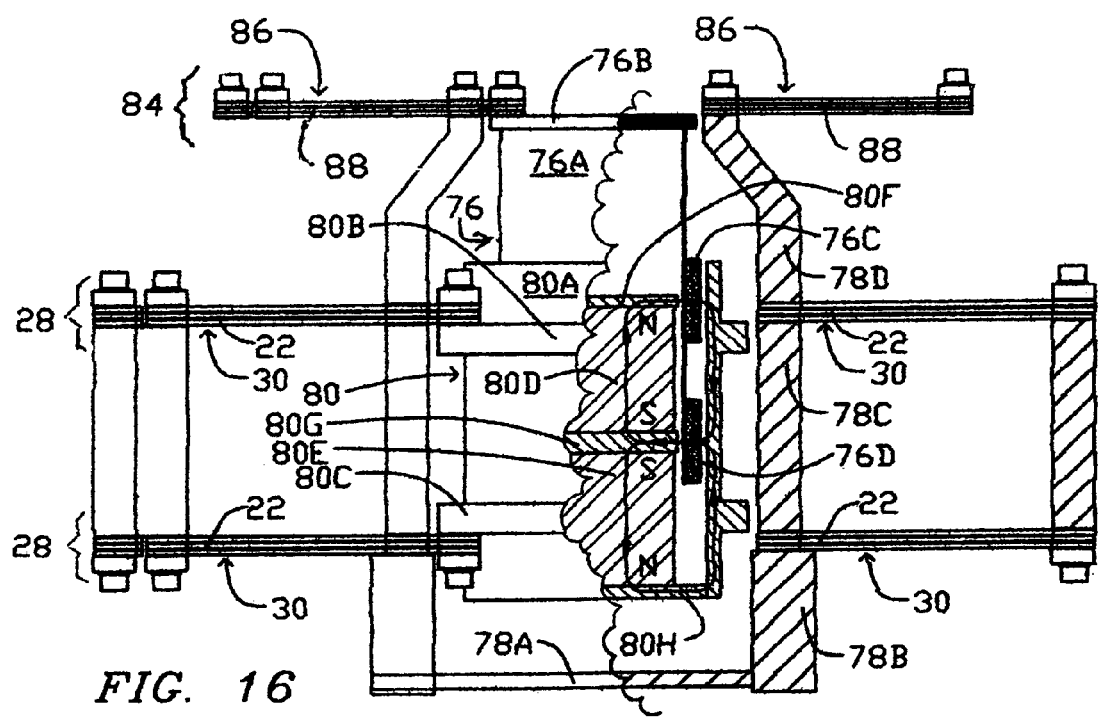
FIG. 16 is a front elevation of the three tier folded flexure dual-resonance actuator of FIG. 15 with a right hand portion cut away to show, in a central cross-section taken at 16-16 in FIG. 15, a 2-coil 2-magnet motor configuration.

FIG. 16 is a front view of the dual resonance actuator of FIG. 15 with a partial cutaway cross-section taken through 16-16 (FIG. 15).

The armature 80 includes a ferrous sleeve 80A configured with two suspension mounting flanges: 80B near the top and 80C near the bottom. Sleeve 80A surrounds and provides bottom support to the stack of two permanent magnets 80D and 80E, upper pole plate 80F and central pole plate 80G located between the two magnets. The two magnets 80D and 80E are arranged in mirror image relationship with regard to magnetic polarity as indicated: NS/SN (alternatively SN/NS).

A bottom magnetic yoke plate 80H of ferrous sleeve 80A supports the magnetic core assembly and provides a link in the magnetic loop path that produces flux concentrations in the two annular air gaps at the periphery of circular pole-plates 80F and 80G.

Centered about these two magnetically charged air gaps are two coil windings 76C and 76D, each wound into bobbin 76A in corresponding coil compartments, forming a coil/bobbin mass node that can be driven to reciprocate relative to the magnetic armature mass node when the coils are energized with alternating current at a secondary frequency that is at or near the natural resonant frequency of the coil/bobbin mass node and its suspension compliance (spring rate).

The magnetic armature 80 is suspended optimally by the middle and lower flexure tiers 28, each tier 28 consisting of a pair of balanced quad array members 30.

Dual resonance is accomplished by isolating the coil/bobbin assembly 76 from the base portion 78D to serve independently as a second mass node suspended by the third flexure tier 84 with array members 86 utilizing special span elements 88. The result is a secondary natural resonant frequency, i.e. that of coil/bobbin assembly 76 forming the second mass node, that is different from the primary natural resonant frequency, i.e. that of magnetic armature 80. Thus when A.C., at or near the secondary resonant frequency, is applied to the coil windings 76C and 76D, the coil/bobbin assembly 76 will reciprocate at the applied frequency.

The configuration shown, with two magnets (80D and 80E) in the armature 80 and two coils (76C and 76D) in coil/bobbin assembly 76, operating in the "voice coil" mode, is considered a preferred linear motor for a dual resonance actuator. However, the invention could be practiced in other implementations, e.g. with only one magnet and one coil, or further extended to have three or more sections.

The invention may also be practiced in the dual resonance configuration by extending bobbin 76A through appropriate clearances in plate 80H and mirroring connection 76B, elements 88 and base element 78D to provide additional spring stiffness and more robust resistance to forces off the motion axis.

Preferred embodiment of the invention incorporate certain design principles that must be observed regarding doubly and triply balanced configuration to obtain full benefit of the available cancellation of unwanted horizontal forces.

Array members in each tier should be identical and arranged in a uniform polar pattern centered on the thrust axis, e.g. two array members in mirror image relationship about the axis. The array members, preferably made to contain three or four span elements, should be configured with longitudinal and cross-sectional symmetry for balance. Each span element should be uniform in width and thickness throughout the entire span.

In any embodiment, there may be possibilities of varying the shape, width, length, and thickness of the span elements and stacks thereof to optimize for particular dimensional and operating parameters, while retaining overall symmetry and balance. While making the span elements uniform in width is preferred as being both effective and economical, the invention could be practiced with span elements of non-uniform width and/or thickness, especially with an even number of span elements, e.g. hourglass shaping as discussed above in connection with known art quad arrays.

In a two-tier actuator, the tiers are typically made identical; however the invention could be practiced with the tiers made non-identical, i.e. different number and/or types of array members and/or different basic tier configurations.

In the balanced triad and quad array members, the preferred sequence of span element destinations across each array member is shown above as MBM and MBBM respectively, where M refers to the mass node and B refers the base node as the destination of the attachment end of a span element. Those sequences are believed to optimize both balance performance and overall package space efficiency. However the invention could be practiced with theoretically no loss of balance performance utilizing the inverse span element destination sequences BMB and BMMB respectively.

Similarly the invention could be practiced with any number of tiers, typically with one tier each at the top and bottom of the armature mass assembly, and the other tiers disposed between those two.

In general the folded flexure principle of the invention may be practiced with any of the different armature mass assembly configurations disclosed above in combination with any of the tier configurations disclosed above. e.g.

1 magnet and 1 coil as in FIGS. 4A-C,
2 magnets and 1 coil as in FIG. 13,
1 magnet and 2 coils, not shown,
2 magnets and 2 coils as in FIG. 16, and
2 magnets and 3 coils as in FIG. 11.

Similarly, virtually any desired number of magnets and/or coils could be deployed in the practice of the invention, following the above teachings.

Capability of transmitting the reciprocating force of the armature mass to external objects via a shaft such as shaft 74F in FIG. 13 could be implemented in any of the actuators disclosed, located at either top or bottom cover plate regions (or both), which would be provided with a suitable clearance opening.

The invention can be deployed in all of the variations described above without compromising the principle of maintaining symmetry of suspension properties in all three dimensions, as discussed, for inherent cancellation of unwanted horizontal forces and thus prevention of unwanted horizontal armature displacement relative to the base.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A flexure system for suspending a mass relative to a base in a compliant manner that allows the mass to be moved by an applied force only in a straight line and within a designated stroke length along a central stroke axis of the mass, comprising:

at least two flexure array members, each array member including a plurality of compliant span elements of designated uniform length arranged in a parallel side-by-side layout, each span element having first and second opposite end regions allocated for rigid attachment, each flexure array member having a first virtual half-flexure-member, including at least one of the compliant span elements having the first end region thereof attached rigidly to the base, and a second virtual half-flexure-member including at least one of the compliant span elements having the first end region thereof rigidly attached to the mass: and at least one yoke/idler fastening associated with each flexure array member and attached rigidly to at least two adjacent compliant span elements at the second end thereof, each compliant span element having the second end thereof attached rigidly to an associated yoke/idler fastening;

wherein the span elements are made, arranged and dimensioned such that the two virtual half-flexure-members are thusly made to be substantially equal to each other with regard to spring compliance.

2. The flexure system as defined in claim 1, wherein, for purposes of primary balance:

the flexure array members are deployed only in balanced pairs each located with the two array members disposed uniformly one on each opposite side of the mass; and the compliant span elements of each array member are arranged in mirror-image symmetry about a lateral axis perpendicular to the central stroke axis;

whereby extraneous forces from the compliant span elements in any direction other than a desired component along the central stroke axis will tend to oppose each other about the lateral axis and thus cancel each other with respect to effect on the mass.

3. The flexure system as defined in claim 2, wherein, for purposes of double balance;

the parallel compliant span elements in each flexure array member are arranged in a mirror-image layout that is made to be symmetrical about the longitudinal axis;

whereby extraneous forces from the compliant span elements in any direction other than a desired component along the central stroke axis will tend to oppose each other about the longitudinal axis and thus cancel each other with respect to effect on the mass.

4. The flexure system as defined in claim 3, wherein, for purposes of triple balance;

each compliant span element is attached at each end thereof in a rigid manner that is especially made to be effectively mirror-image and symmetrical about a longitudinal center line of the compliant span element with respect to physical dimensions and related compliance acting on the mass;

whereby effects of the compliant span element on the mass will tend to be balanced about a quiescent location within the stroke length and thus minimize harmonic distortion effects of the flexure system on the mass.

5. The flexure system as defined in claim 4, wherein:

the triply balanced system comprises, as each array member, a balanced quad array member having four like compliant span elements arranged side-by-side in a layout, referenced sequentially from side to side as A, B, C, and D; and at the first end of each, A and D are connected to the mass and B and C are connected to the base, and at the second end of each, A and B are connected together by an associated yoke/idler fastening, and C and D are connected together by an associated yoke/idler fastening.

6. The flexure system as defined in claim 5, wherein, additionally, compliant span elements B and C are connected together along with A and D by a common yoke/idler fastening.

7. The flexure system as defined in claim 4, wherein the triply balanced system comprises, as each array member, a balanced quad array member having four like compliant span elements arranged side-by-side in a layout, referenced sequentially from side to side as A, B, C, and D, wherein, at the first end of each, A and D are connected to the base and B and C are connected to the mass, and at the second end of each, A and B are connected together by a yoke/idler fastening, and C and D are connected together by a yoke/idler fastening.

8. The flexure system as defined in claim 7, wherein, additionally, compliant span elements B and C are connected together along with A and D by a yoke/idler fastening.

9. The flexure system as defined in claim 4, wherein the triply balanced system comprises, as each array member, a balanced triad array member having a central standard-width compliant span element flanked by a pair of half-width compliant span elements, all three being equal in length and being connected together at the second end.

10. The flexure system as defined in claim 9, wherein, in each balanced triad array member, each of the half-width compliant span elements is connected at the first end thereof to the mass, and the central standard-width compliant span element is connected at its first end to the base.

11. The flexure system as defined in claim 9, wherein, in each balanced triad array member, each of the half-width compliant span elements is connected at the first end thereof to the base, and the central standard-width compliant span element is connected at its first end to the mass.

12. The flexure system as defined in claim 1, comprising a plurality of flexure array members each located on a corresponding radial line of a uniform polar pattern about the stroke axis.

13. The flexure system as defined in claim 12, wherein each array member comprises a balanced triad array member having a central standard-width compliant span element flanked by a pair of half-width compliant span elements, all three being equal in length and being connected together at the second end.

14. The flexure system as defined in claim 13 wherein, in each balanced triad array member, each of the half-width compliant span elements is connected at the first end thereof to the mass, and the central standard-width compliant span element is connected at its first end to the base.

15. The flexure system as defined in claim 14, wherein each balanced triad array member is located centered on a corresponding radial line with the second end and the yoke/idler fastening directed inwardly toward the central stroke axis.

16. The flexure system as defined in claim 14, wherein each balanced triad array member is located centered on a corresponding radial line with the second end and the yoke/idler fastening directed outwardly away from the central stroke axis.

17. The flexure system as defined in claim 1 wherein the flexure array members are arranged in a plurality of tiers each in a differently located plane along the central stroke axis, each tier having a plurality of array members.

18. The flexure system as defined in claim 17 comprising two tiers located respectively in proximity to two opposite ends of the mass.

19. The flexure system as defined in claim 17 comprising:
   at least three tiers each providing a suspension configured with a balanced pattern of array members;
   two of the tiers being located so as to doubly suspend a first portion of the mass; and
   at least a third tier, made and arranged to suspend a second portion of the mass:
   whereby, with suitable selection of each mass portion and the respective compliance of each suspension, the flexure system is enabled to exhibit two different natural resonant frequencies from which an operating frequency may be selected.

20. The flexure system as defined in claim 19 wherein the first mass portion includes at least one permanent magnet of an actuator linear motor and the second mass portion includes at least one coil and bobbin assembly of the actuator linear motor.

* * * * *